United States Patent Office 3,489,899
Patented Jan. 13, 1970

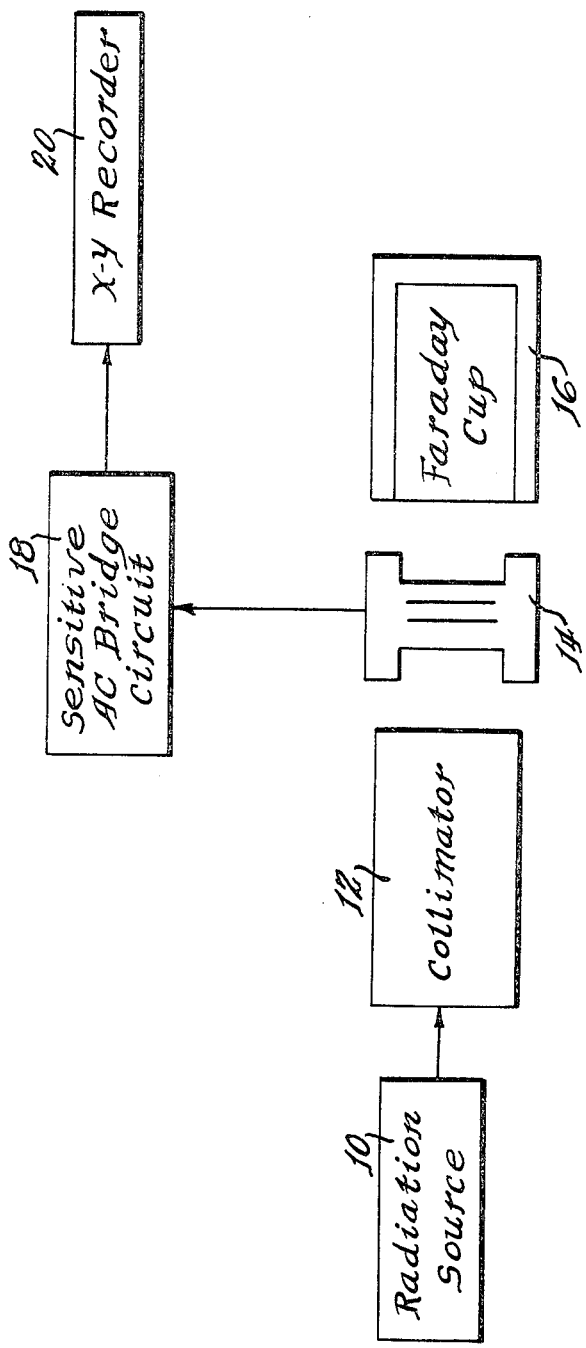

3,489,899
CALORIMETRIC METHOD OF MEASURING RADIATION BY SOLUTION CONDUCTIVITY CHANGE
Klaus H. Schmidt, Downers Grove, Ill., assignor to the United States of America as represented by the United States Atomic Energy Commission
Filed Dec. 19, 1967, Ser. No. 691,746
Int. Cl. G01t 1/16
U.S. Cl. 250—83      5 Claims

ABSTRACT OF THE DISCLOSURE

A method for determining the absorbed dosage in a pulse of ionizing radiation by measuring the increase in conductivity of an electrolyte solution due to absorbed radiation.

Contractual origin of the invention

The invention described herein was made in the course of, or under, a contract with the United States Atomic Energy Commission.

Background of the invention

This invention relates to a method and apparatus for measuring ionizing radiation dosages. More specifically, this invention relates to a method and apparatus for measuring the absorbed dosage in a short pulse or burst of ionizing radiation.

An absorbed dose of any ionizing radiation is the amount energy imparted to matter by ionizing particles per unit mass of irradiated material at the place of interest, such as a part of the body. This is generally measured in rads or radiation absorbed dose.

Instruments for measuring radiation dose are routinely used as an aid in controlling radiation exposure of workers in laboratories and plants where radio active materials are handled and these instruments are also used extensively in connection with radiation therapy and radiation experiments.

Dosimeters for this latter purpose are generally of two different types, an ion chamber or a chemical dosimeter.

A typical ion or ionization chamber consists of an insulated metal chamber containing parallel plate electrodes, or a tube with a metal lining, which serves as the cathode, and an inner wire anode. The chamber or tube is filled with air, carbon dioxide, argon or other suitable gas. The ions produced in the gas by a radiation-induced ionization event are converted into a measurable electrical impulse or current by means of a voltage applied across the electrodes. The voltage, which may be supplied by a storage battery, is just sufficient to drive the primary ions to the electrodes; i.e. they are accelerated enough to prevent ion recombination, but not enough to induce secondary ionization.

A common chemical dosimeter is the Fricke ferrous sulfate dosimeter. This consists of a glass or polystyrene container filled with an aqueous solution of ferrous sulfate and sulfuric acid. Ionizing radiation oxidizes the ferrous sulfate to ferric sulfate. The radiation dosage is then determined by reading the amount of solution color change through a spectrophotometer.

While both of the devices described are generally quite adequate at lower radiation intensities, at high radiation intensities the devices become unusable. At high dosage levels, the Fricke dosimeter is no longer linear in response due to a prevalence of second order chemical reactions. This requires that corrective factors be applied to obtain an accurate dosage reading. Ion chambers become unusable due to failure to obtain saturation at high radiation intensities.

One type of instrument which is capable of recording large dosages of radiation is a calorimeter. In this device, the absorbed radiation produces heat in a sample which when accurately measured can be equated to the amount of radiation which has been absorbed by the sample material. These devices are, however, difficult to work with. All parts of the calorimeter absorb radiation and thus generate heat and special provision must be made for distinguishing between heat generated by the sample material and that being produced in the rest of the apparatus. The temperature in the sample material can either be measured by thermocouples or by thermistors. These measuring instruments are subjected to radiation and in time the thermistors may be damaged and require replacement or recalibration in order to continue to obtain the sensitive readings needed for an accurate determination of radiation dosage. Thermocouples are generally insensitive and thus not able to detect the very small changes in temperature which occur and are necessary to obtain accurate readings.

In order to equate dosages derived from some of the before-mentioned dosimeters to living tissue, corrective factors must be applied, requiring time and introducing a chance for error. A dosimeter which uses a medium similar to tissue composition would require that little or no correction be made in order to determine what the radiation dosage in tissue would be from a similar pulse of ionizing radiation.

Summary of the invention

The method of my invention consists in preparing an aqueous electrolyte solution. After measuring the conductivity of the solution, it is exposed to ionizing radiation and the conductivity again measured. The increase in conductivity is due to the increase in solution temperature which is directly proportional to the ionizing radiation absorbed by the solution.

The device for practicing the above-described method consists of a conductivity cell having two parallel electrodes containing the electrolyte solution, means for determining the solution conductivity and a device for recording the results.

My method and device can be used for accurately measuring high-energy pulsed radiation dosages where large radiation dosages may be delivered in microseconds or shorter times.

Because my device uses water as the heat-absorption medium, the dosages determined from it are very nearly the same as dosages which would be absorbed by living tissue and thus may be used to determine absorbed tissue dose with little or no correction.

My device has the advantage over many other instruments in that it maintains its stability and hence accuracy for large periods of time and under heavy doses of radiation without requiring replacement or recalibration.

It is one object of this invention to provide a device and method of measuring large dosages of ionizing radiation received in short periods of time which is both simple to operate and accurate in its dosage determination.

It is another object of this invention to provide a device and method of measuring large dosages of ionizing radiation to obtain a reading which is tissue equivalent and can be equated to radiation dosages in living tissue without the necessity of making complicated mathematical calculations.

Brief description of the drawing

The figure is a block diagram of the apparatus of my invention.

Description of the preferred embodiment

Referring now to the figure, pulses of ionizing radiation from radiation source 10 are collimated in collimator 12, pass through conductivity cell 14 containing an aqueous electrolytic solution, and into Faraday cup 16 where the electrical charge is collected.

The increase in conductivity of the electrolytic solution due to the radiation is measured between the electrodes in cell 14 by sensitive A–C bridge circuit 18 and traced by XY recorder 20 for permanent record. The increase in solution conductivity is directly proportional to the temperature increase of the electrolytic solution which was caused by the radiation energy or rads absorbed by the electrolytic solution.

The Faraday cup does not constitute a part of the apparatus of this invention. The cup was used in an experimental device to collect an electrical charge from the radiation in order to determine the relative strength between radiation pulses. It was also used to make a comparison between the dosimeter of this invention and a chemical dosimeter, as explained more fully in Example I.

The cell is filled with an aqueous electrolyte solution which may be buffered to minimize any change in hydrogen ion concentration which would change the solution conductivity. Although other compounds may work as well, $Na_2HPO_4$ and $KH_2PO_4$ are used because they are inorganic buffers having a neutral pH. Solutions containing from 2–4 mM. $KH_2PO_4$ and 3–6 mM. $Na_2HPO_4$ in double distilled water were found to give satisfactory results. A solution containing too great a concentration of electrolyte is to be avoided to minimize polarization of the electrodes. However, the concentration depends upon the geometry of the cell being used, since a greater distance between electrodes would permit greater concentrations of electrolyte. Conversely, a solution containing too small a concentration of electrolyte may change in conductivity due to chemical changes of the electrolyte and produce false conductivity readings. Of course, organic electrolytes are to be avoided to prevent chemical breakdown of the solution which will affect readings. At least double distilled water should be used to minimize contamination.

Once the increase in conductivity of the solution is known, the temperature increase is determined from the temperature coefficient of the solution. The temperature coefficient for aqueous electrolyte solutions is generally on the order of 2% per degree centigrade. The following coefficients were determined by measurement of the phosphate solution: 2.288% at 20° C.; 2.154% at 25° C.; and 1.969% at 30° C. Once the temperature rise of the solution has been determined, the number of calories produced by the radiation are known and can easily be converted into rads.

It was found important to preirradiate the cell in order to obtain chemical equilibrium within the electrolytic solution. This is necessary to destroy any chemical impurities which might be present in the electrolyte which could provide false readings by changing the solution conductivity. 20–50 kilorads of radiation are usually sufficient to achieve equilibrium depending upon the amount of impurities present.

The conductivity cell is constructed of quartz, although plexiglass or any similar material would be quite satisfactory. The two electrodes within the cell are thin platinum foil spaced about 7 mm. apart, although the spacing is not critical. Again, other conductive metal foils such as nickel would be satisfactory.

Correction factors which will be readily apparent to one skilled in the art must be considered when using the dosimeter of this invention.

Because the bridge circuit measures the average conductivity increase for the entire cell, it is important to ascertain the correction factor necessary when the geometry of the cell and the diameter of the radiation beam are such that only a portion of the solution is subjected to radiation. This discrepancy can be corrected by multiplying the measured conductivity change by a volume correction factor obtained from a ratio of the dynamic cell factor to the static cell factor. The static cell factor is determined from the conductivity of the cell containing an electrolytic solution of known conductivity. The dynamic cell factor is calculated by dividing the distance between electrodes by the irradiated area. The ratio obtained from these factors when multiplied by the measured conductivity change will give the actual increase in conductivity in the irradiated portion of the electrolytic solution.

An additional correction factor must be considered for the radiation which is absorbed as heat by the electrodes due to passage of the radiation through them. It was found that this heat was practically instantaneously given up to the electrolyte solution which surrounds the electrodes. One-half of the heat absorbed by the electrodes will go into that portion of the solution which is between the electrodes and thus will have an effect upon conductivity change measurements even though it does not constitute a portion of the radiation absorbed into the test volume, that is the irradiated volume between the electrodes. This electrode correction factor will, of course, be dependent upon cell and electrode geometry and upon electrode composition since different materials will have different stopping powers for the various types of radiation.

The following examples are given as an illustration of the method and apparatus of this invention and are not to be taken as limiting the scope or extent of the invention.

EXAMPLE I

In order to compare the accuracy of the dosimeter of this invention with a dosimeter of known capabilities, a comparison was made with a Fricke chemical dosimeter. The comparison was made by pulse irradiating the cell of this invention containing a buffered phosphate solution in a linear accelerator, determining the dosage and noting the charge collected by a Faraday cup which was placed behind the cell to collect the radiation charge. In the same manner, the same cell was filled with Fricke dosimeter solution and pulse irradiated in the same accelerator, the dosage determined and the Faraday cup charge noted. By using the ratio between the charges collected in the Faraday cup, it was possible to make an accurate comparison of the dosages as determined by the two methods. Such a comparison showed the dosage obtained by the dosimeter of this invention agreed within 1.67% of the dosage obtained by the Fricke chemical dosimeter.

EXAMPLE II

A quartz cell about 2¾" in diameter containing two platinum foil electrodes 1¾" in diameter and 7 mm. apart was filled with a solution of 4 mM. $KH_2PO_4$ and 6 mM. $Na_2HPO_4$ in triple distilled water and preirradiated with 1 megarad from a Co–60 source. The cell was placed behind a collimator and in front of a Faraday cup in the electron beam of a 15 mev. linear accelerator. The single pulse had a duration of four microseconds and the pulse current was 80 milliamps. The actual conductivity change was 0.003% in the entire cell and, using a volume correction factor of 4, 0.012% in the irradiated portion of the cell. Since the temperature coefficient is about 2% per ° C., the actual temperature change was 0.006° C. in the irradiated volume. After applying an electrode correction factor of 20% the radiation dosage obtained was 1200 rad.

It is to be understood that the invention is not to be limited to the details given herein but that it may be modified within the scope of the appended claims.

The embodiments of the invention in which an exclusive property or privilege is claimed are defined as follows:

1. A method of determining radiation dosage from pulsed radiation comprising: preparing a neutral aqueous electrolyte solution, measuring the electrical conductivity of said solution, subjecting said solution to ionizing radiation whereby said solution increases in temperature, thereby increasing in conductivity, and measuring the increase in conductivity of said solution, the increase in conductivity of said solution being directly proportional to the radiation dosage absorbed by said solution.

2. The method of claim 1 wherein said solution is a buffered solution.

3. The method of claim 2 wherein said buffered solution contains 2–4 mM. $KH_2PO_4$ and 3–6 mM. $Na_2HPO_4$ in triple distilled water and said solution is preirradiated with 1 megarad of radiation.

4. A dosimeter for measuring pulsed radiation dosages comprising: a conductivity cell containing two spaced electrodes, an electrolyte within said cell between said electrodes for absorbing said radiation; means, connected to said electrodes, for measuring conductivity increase in said electrolyte, said conductivity increase being directly proportional to said radiation absorbed by said electrolyte.

5. The dosimeter of claim 4 wherein the electrolyte is a buffered solution containing 2–4 mM. $KH_2PO_4$ and 3–6 mM. $Na_2HPO_4$ in water.

References Cited

UNITED STATES PATENTS 3,030,510   4/1962   Reeder.
3,179,581   4/1965   Lewin et al.

ARCHIE R. BORCHELT, Primary Examiner

U.S. Cl. X.R.

324—30, 65